United States Patent [19]

Quenot

[11] 3,934,352
[45] Jan. 27, 1976

[54] LINEAR MEASURING INSTRUMENT

[75] Inventor: Michel Quenot, Besancon, France

[73] Assignee: Stanley-Mabo, Besancon, France

[22] Filed: Feb. 27, 1974

[21] Appl. No.: 446,318

[30] Foreign Application Priority Data

Mar. 6, 1973 France ............................ 73.7911

[52] U.S. Cl. ................... 33/111; 33/107; 264/247
[51] Int. Cl.² ........................................... B43L 7/00
[58] Field of Search ..... D52/6 A; 33/107, 111, 113, 33/137; 264/245, 246, 247

[56] References Cited
UNITED STATES PATENTS

| | | |
|---|---|---|
| 1,602,490 | 10/1926 | Homan .................................. 33/111 |
| 2,171,504 | 8/1939 | Keuffel et al. ..................... 33/113 X |
| 2,467,928 | 4/1949 | Bolter ............................... 33/137 R |
| 2,851,731 | 9/1958 | Gits et al. ............................. 264/247 |
| 2,994,925 | 8/1961 | Gits..................................... 264/247 |
| 3,016,579 | 1/1962 | Schlitzkus ........................... 264/247 |

Primary Examiner—Richard E. Aegerter
Assistant Examiner—Charles E. Phillips
Attorney, Agent, or Firm—Prutzman, Hayes, Kalb & Chilton

[57] ABSTRACT

A rigid linear measuring instrument has a central core moulded integrally with plastics bodies in relief. A plastic material of different colour is moulded over the core flush with outer faces of said bodies which form a series of graduation figures and graduation lines.

5 Claims, 5 Drawing Figures

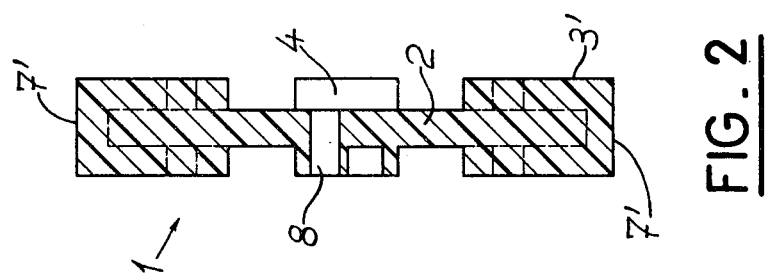
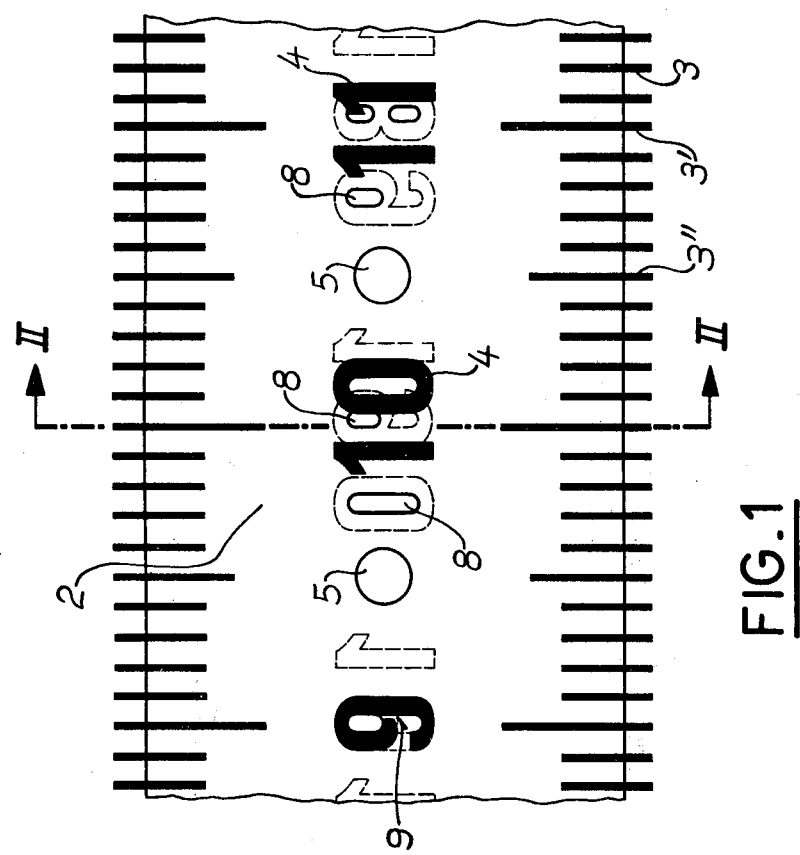

LINEAR MEASURING INSTRUMENT

The invention relates to rigid linear measuring instruments, particularly but not exclusively folding rules, and to processes for manufacturing such instruments.

There have already existed for some time folding rules with arms of plastics material manufactured by injection moulding and on which both graduation lines and graduation figures are printed in black or red by a heat stamping process.

Folding rules obtained by this process, although of high quality when new, are subject in the long term to wearing away of the affixed colour and of the imprinted grooves, which results in the graduation figures and graduation lines becoming at least partially illegible.

An aim of the invention is to provide a linear measuring instrument, for example the arms of folding rules made of plastics material, the graduation lines and figures of which are very clear and ineffaceable, ever after prolonged use of the instrument.

According to the invention a rigid linear measuring instrument comprises an elongate rectilinear member of plastics material with aa series of graduation lines and graduation figures formed by plastics bodies embedded in a plastics coating having a colour different to that of said bodies, said bodies and the coating defining an outer surface of the member of generally uniform cross-section with end faces of said bodies forming graduation lines and graduation figures flush with said outer surface.

Preferably, the instrument comprises a rectilinear support on which said bodies forming the graduation lines and figures are provided in relief, the support being embedded in the plastics coating.

Another preferred feature is that the elongate member has top and bottom faces and relatively narrow straight lateral edges, and said bodies forming graduation lines are each transverse to the longitudinal direction of the member and have end faces flush with said top and bottom faces and a lateral edge.

Furthermore, the known processes for manufacture of rigid linear measuring instruments in plastics materials have several disadvantages. After moulding an elongate member, the graduation lines and figures must be applied, often to two surfaces, by a separate operation. This operation involves difficulties as regards the exact correspondence of the graduation on the front and back surfaces.

A further aim of the invention is to provide a novel manufacturing process which enables this difficulty to be overcome.

According to the invention, a method of manufacturing a rigid linear measuring instrument comprises providing on an elongate rectilinear support a plurality of plastics bodies in relief, said bodies having end faces disposed to form a series of graduation lines and graduation figures, and over-moulding about said support flush with said end faces of the bodies a plastics coating having a colour different to that of said bodies to define an outer surface of elongate rectilinear member having a generally uniform cross-section.

The novel linear measuring instrument according to the invention has many advantages. It can be of greater strength than those known previously without being more expensive to produce. Its process of manufacture by at least two successive injection moulding operations can be carried out automatically and allows very large scale massproduction without manual work. On the other hand, this process enables the two heat stamping operations on each arm to be dispensed with, in the case of a recto-verso rule, which reduces its cost of manufacture. A further advantage of the preferred embodiments of folding rules obtained by this process is that the graduations appear clearly visible on the lateral sides which is not so in metal, wood or plastics folding rules known up to the present time. Moreover, the outer coating totally envelopes the central support, so that perfect adherence of the over-moulding and homogeneity of the assembly are guaranteed.

The invention will be specifically described, by way of example, with reference to the accompanying drawings, in which:

FIG. 1 is a partial elevation of a central support after a first injection;

FIG. 2 is a cross-section taken along line II—II of FIG. 1;

Figure 4:
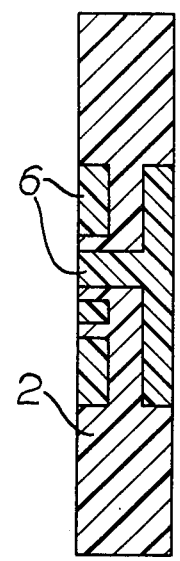
FIG. 4 is a cross-section taken along line IV—IV of FIG. 3.
Figure 5:
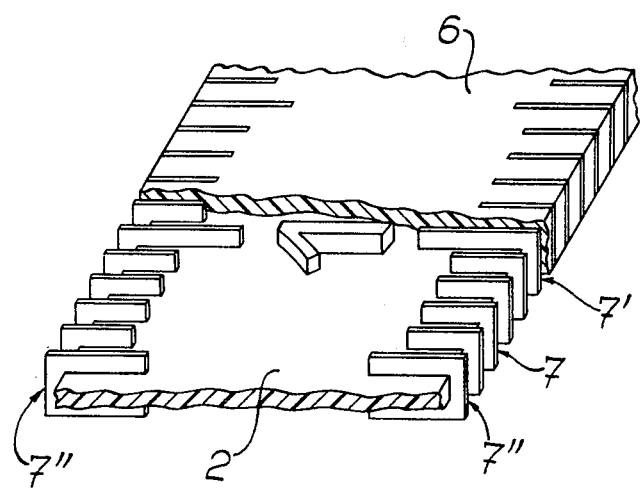

FIG. 5 is a perspective view of a portion of the instrument, partially broken away and in cross-section. With reference to FIGS. 1 and 2, a central brace 1 of a folding rule is formed, for example of black plastics material, by an injection molding operation in a double mould. This central brace 1 comprises a flat rectilinear portion 2 forming a core or support, which is preferably reinforced with glass fibre or another material and has planar top and bottom surfaces. On this rectilinear portion 2 are formed in relief and moulded integrally with it, on the one hand transverse U-shaped plates forming millimeter, centimeter and half-centimeter graduations 3, 3', 3'' respectively which have legs forming the relief lines on planar surfaces and a connecting base having lateral faces 7, 7', 7'' projecting laterally outwardly beyond the longitudinal edges of the core. The core has, on the other hand, graduation figures 4 and a plurality of openings 5 which ensure, when the over-moulding is subsequently carried out, a mechanical connection between the front and back coatings of the support.

In order that, upon over-moulding an outer coating 6, the material forming this coating can penetrate the loops of the numbers 0, 6, 8 and 9 situated on either face of rectilinear support 2, these said loops open out through holes 8 on the opposite face of the said support. When it is not convenient to make the inside of one of these loops open out on the opposite face, e.g. when another graduation figure appears on the said opposite face in the same position, provision is made to not completely close the loop of the number in question by leaving a small space 9.

Figure 3:
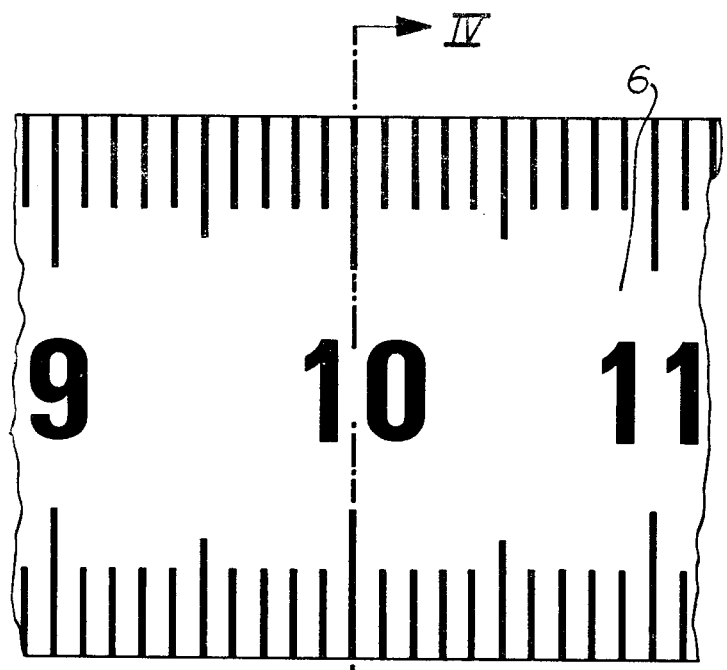
FIG. 3 is a partial elevation of the finished instrument after the second injection.

With reference to FIGS. 3, 4 and 5, the object to be moulded is next transferred to a second portion of the mould, in which outer coating 6 is injection moulded. The second portion of the mould is so formed that it exactly contains central brace 1, reliefs 3, 3', 3'' and 4 of the latter bearing with their outer faces against the upper, lower and lateral walls of the mould. Outer coating 6 is formed of a plastics material of light colour, preferably white, of high fluidity, so that upon moulding it penetrates into the narrow gaps formed between the graduation lines and fills them completely. This plastics material will preferably be selected of high quality and so as to offer a shiny polished appearance.

Upon removal from the mould, the black graduation figures and lines stand out on the light face of the outer coating with great clarity and flush with the level of the said outer surface.

Linear measuring instrument arms of several colours may also be made by this process. For example, either the graduation lines may be provided in back and the graduation figures in another colour, e.g. red, or centimeter graduation lines and figures may be provided in a same colour, e.g. black, and decimeter graduation figures in another colour, e.g. red, many combinations being possible.

In this case, a first part of the graduation lines and/or graduation figures is formed integrally with the rectilinear support 2 in relief and by the same operation of moulding for example in a black plastics material, and then the missing graduation lines and/or graduation figures are moulded onto support 2, for example with a red plastics material, by a second injection and by means of an appropriate mould. Finally the outer coating of, for example, white plastics material is overmoulded on the assembly thus formed.

This process therefore provides rigid linear measuring instruments, in particular arms of a folding rule, in which the graduation lines 3, 3' and 3" and the graduation figures 4 are bodies made of, for example, black and/or red plastics material, embedded in a plastics coating 6 of another colour, for example white. The bodies of graduation lines 3, 3' and 3" and graduation figures 4 are formed on a rectilinear support 2 and moulded with or onto it and the graduations have faces 7, 7' and 7" visible on the narrow lateral faces body 2. The assembly formed by the bodies and coating 6 is of uniform thickness and the outer edges of the graduation lines and figures are flush with the outer surfaces of the coating.

This invention has been described for the manufacture of the arms of a folding rule, but can of course be applied to the manufacture of other rigid linear measuring instruments, such as rulers, which need not have a rectangular cross-section although their cross-section is uniform along its length.

What is claimed is:

1. A rigid linear measuring instrument comprising an elongated member of plastic material having a planar rectilinear core bounded by substantially parallel longitudinally extending edges and planar top and bottom surfaces, a series of graduation lines and graduating figures spaced along the longitudinal extent of said core, said planar top and bottom surfaces having lines and figures projecting outwardly in relief therefrom, each graduation line being formed by a transverse U-shaped plate, the legs of said plate forming said relief lines on said top and bottom surfaces, and the base of said U-shaped plate further projecting laterally outwardly beyond said longitudinal edge and interconnecting said legs to provide said generally U-shaped configuration, a plastic coating having a color contrasting with said figures and lines enclosing said core and having a depth substantially equal to the relief depth of said figures and lines and the lateral projection of said lines whereby said figures and lines are flush with the outer surface of said coating on both the planar surfaces and longitudinal edges of the measuring instrument.

2. A linear measuring instrument as claimed in claim 1, in which the graduating figures include closed loops and the core has openings communicating said loops with the opposite planar surface of the core.

3. A linear measuring instrument as claimed in claim 1, in which the core is a reinforced plastic material support includes a central reinforcement embedded in a plastics material.

4. A linear measuring instrument according to claim 3, in which said reinforcement includes glass fibres.

5. A linear measuring instrument as claimed in claim 1, comprising millimeter, half-centimeter and centimeter graduation lines of different lengths.

* * * * *

UNITED STATES PATENT OFFICE
CERTIFICATE OF CORRECTION

PATENT NO. : 3,934,352
DATED : January 27, 1976
INVENTOR(S) : Michel Quenot

It is certified that error appears in the above-identified patent and that said Letters Patent are hereby corrected as shown below:

Column 1, line 23, the word "aa" should be --a--.

Column 1, line 68, the word "massproduction" should be --mass-production--.

Column 2, line 24, after "cross-section" a new paragraph should begin.

Column 3, line 7, the word "back" should be --black--.

Column 4, line 32, after the word "material" insert --.--. Lines 33 and 34 delete "support includes . . . plastics material.--.

Signed and Sealed this eighteenth Day of May 1976

[SEAL]

Attest:

RUTH C. MASON
*Attesting Officer*

C. MARSHALL DANN
*Commissioner of Patents and Trademarks*